US012801238B2

(12) United States Patent
Lee et al.

(10) Patent No.: US 12,801,238 B2
(45) Date of Patent: Nov. 17, 2026

(54) TOUCH PANEL, ELECTRONIC DEVICE INCLUDING THE SAME AND METHOD FOR OPERATING ELECTRONIC DEVICE

(71) Applicant: Samsung Display Co., Ltd., Yongin-Si (KR)

(72) Inventors: Bo Hwan Lee, Yongin-si (KR); Sang Hun Park, Yongin-si (KR); Young Min Park, Yongin-si (KR); Yong Sub So, Yongin-si (KR); Ho Eung Lee, Yongin-si (KR); Byeong Kyu Jeon, Yongin-si (KR)

(73) Assignee: Samsung Display Co., Ltd., Yogin's (KR)

( * ) Notice: Subject to any disclaimer, the term of this patent is extended or adjusted under 35 U.S.C. 154(b) by 16 days.

(21) Appl. No.: 19/008,663

(22) Filed: Jan. 3, 2025

(65) Prior Publication Data

US 2026/0064223 A1 Mar. 5, 2026

(30) Foreign Application Priority Data

Aug. 29, 2024 (KR) ........................ 10-2024-0117049

(51) Int. Cl.
*G06F 3/041* (2006.01)
*G06F 3/0354* (2013.01)
*G06F 3/044* (2006.01)

(52) U.S. Cl.
CPC .... *G06F 3/041661* (2019.05); *G06F 3/03545* (2013.01); *G06F 3/0446* (2019.05)

(58) Field of Classification Search
CPC ........... G06F 3/03545; G06F 3/041661; G06F 3/0446
See application file for complete search history.

(56) References Cited

U.S. PATENT DOCUMENTS 8,325,147 B2 * 12/2012 Brand ..................... G06F 3/044 345/173
8,773,386 B2 * 7/2014 Wilson .................... G06F 3/041 345/173

(Continued)

FOREIGN PATENT DOCUMENTS

CN 104991678 A 10/2015
CN 215679334 U 1/2022

(Continued)

OTHER PUBLICATIONS

Machine translation of JP-2020140470-A. (Year: 2026).*
Machine translation of KR-102374750-B1 (Year: 2026).*
Machine translation of KR-20170016556-A (Year: 2026).*

*Primary Examiner* — Michael Pervan
(74) *Attorney, Agent, or Firm* — Innovation Counsel LLP

(57) ABSTRACT

A touch panel includes: a substrate; a first touch electrode part including first-1 electrodes and first-2 electrodes; a second touch electrode part including second-1 electrodes and second-2 electrodes; first DEMUX modules which each share an adjacent first-1 electrode and first-2 electrode of the first touch electrode part with one output; second DEMUX modules which each share an adjacent second-1 electrode and the second-2 electrode of the second touch electrode part with one output; and a touch sensor which includes first touch channels each connected with the first DEMUX modules, and second touch channels each connected with the second DEMUX modules, and is configured to provide a first channel signal to control operations of the first DEMUX modules to the first DEMUX modules, and provide a second channel signal to control operations of the second DEMUX modules to the second DEMUX modules.

10 Claims, 6 Drawing Sheets

(56) References Cited

U.S. PATENT DOCUMENTS

| | | | | | |
|---|---|---|---|---|---|
| 10,222,897 | B2 * | 3/2019 | Wang | G06F 3/04184 | |
| 11,874,706 | B2 * | 1/2024 | Kim | G06F 1/1637 | |
| 12,443,293 | B2 * | 10/2025 | Kremin | G06F 3/03545 | |
| 2012/0169660 | A1 * | 7/2012 | Seo | G06F 3/0446 | 345/174 |
| 2014/0043251 | A1 * | 2/2014 | Wilson | G06F 3/041 | 345/173 |
| 2014/0253481 | A1 * | 9/2014 | Kim | G06F 1/3262 | 345/173 |
| 2016/0162102 | A1 * | 6/2016 | Shahparnia | G06F 1/3215 | 345/174 |
| 2017/0235405 | A1 * | 8/2017 | Wang | G06F 3/04184 | 345/173 |
| 2023/0297140 | A1 * | 9/2023 | Kim | G06F 3/038 | |
| 2024/0160305 | A1 * | 5/2024 | Jin | G06F 3/041 | |

FOREIGN PATENT DOCUMENTS

| | | | | | |
|---|---|---|---|---|---|
| CN | 114879858 | A | | 8/2022 | |
| JP | 2020140470 | A | * | 9/2020 | |
| KR | 10-2012-0078072 | A | | 7/2012 | |
| KR | 20170016556 | A | * | 2/2017 | G09G 3/20 |
| KR | 102374750 | B1 | * | 3/2022 | G06F 3/0416 |

* cited by examiner

TOUCH PANEL, ELECTRONIC DEVICE INCLUDING THE SAME AND METHOD FOR OPERATING ELECTRONIC DEVICE

CROSS-REFERENCE TO RELATED APPLICATION AND CLAIM OF PRIORITY

This application claims priority to Korean Patent Application No. 10-2024-0117049 filed on Aug. 29, 2024 in the Korean Intellectual Property Office (KIPO), the entire disclosure of which is incorporated by reference herein.

TECHNICAL FIELD

Various embodiments of the present disclosure relate to a touch panel, an electronic device including the touch panel, and a method for operating the electronic device.

BACKGROUND

Recently, electronic devices, which support a touch input in addition to or instead of an input device such as a keyboard and mouse, are increasing. For example, electronic devices including a touch panel are increasing in recent years. The touch panel has a plurality of touch electrodes which may be arranged in a matrix form on a substrate. The plurality of touch electrodes may be connected with a touch sensor. The touch sensor may recognize (or detect) a touch input based on changes (e.g., a change of a resistance, change of a pressure, change of an electrostatic capacity (or capacitance), etc.) occurring in the plurality of touch electrodes.

The touch panel may generally support a finger input using a finger of a user. A high-end touch panel may support the finger input and pen input using a pen (e.g., an electronic pen). The pen input enables the user to input finer than the finger input.

In order to support the fine touch input, it is necessary for the touch panel supporting the pen input to have a smaller spacing between the touch electrodes. In other words, the touch panel supporting the pen input requires a relatively large number of touch electrodes, as well as a touch sensor including a large number of touch channels. This may cause a problem of increasing manufacturing costs of the touch panel and/or electronic devices including the touch panel.

SUMMARY

According to an aspect of various embodiments of the present disclosure, there is provided a touch panel which enables a user to precisely touch input, an electronic device including the touch panel, and a method for operating the electronic device.

The problems of the present disclosure are not limited to the technical problem described above, and other technical problems not described will be clearly understood by those skilled in the art from the following descriptions.

According to an embodiment of the present disclosure, a touch panel may comprise: a substrate; a first touch electrode part including a plurality of first-1 electrodes and a plurality of first-2 electrodes, which are alternately arranged on the substrate in a first direction at a designated spacing; a second touch electrode part including a plurality of second-1 electrodes and a plurality of second-2 electrodes, which are alternately arranged on the substrate in a second direction perpendicular to the first direction at the designated spacing; a plurality of first DEMUX modules which each share an adjacent first-1 electrode and first-2 electrode of the first touch electrode part with one output; a plurality of second DEMUX modules which each share an adjacent second-1 electrode and the second-2 electrode of the second touch electrode part with one output; and a touch sensor which includes a plurality of first touch channels each connected with the plurality of first DEMUX modules, and a plurality of second touch channels each connected with the plurality of second DEMUX modules. The touch sensor is configured to provide a first channel signal to control operations of the plurality of first DEMUX modules to the plurality of first DEMUX modules, and provide a second channel signal to control operations of the plurality of second DEMUX modules to the plurality of second DEMUX modules.

According to an embodiment, a spacing between the adjacent first-1 electrode and first-2 electrode and a spacing between the adjacent second-1 electrode and second-2 electrode may be ½ of the designated spacing.

According to an embodiment, the designated spacing may be a distance required to recognize a finger touch.

According to an embodiment, the touch sensor may recognize a touch with a first precision through the plurality of first-1 electrodes and the plurality of second-1 electrodes in a first touch mode, and recognize a touch with a second precision smaller than the first precision through the plurality of first-1 electrodes, the plurality of first-2 electrodes, the plurality of second-1 electrodes, and the plurality of second-2 electrodes in a second touch mode.

According to an embodiment, the touch sensor may distinguish inputs of the adjacent first-1 electrode and the first-2 electrode in a time division manner, and distinguish inputs of the adjacent second-1 electrode and the second-2 electrode in the time division manner in the second touch mode.

According to an embodiment, the first touch mode may be a mode to recognize a finger touch, and the second touch mode is a mode to recognize a pen touch.

According to an embodiment, the first channel signal may include a first-1 channel signal to activate the plurality of first-1 electrodes and a first-2 channel signal to activate the plurality of first-2 electrodes. The plurality of first DEMUX modules may include a first switching element which is operated according to the first-1 channel signal and a second switching element which is operated according to the first-2 channel signal.

According to an embodiment, the second channel signal may include a second-1 channel signal to activate the plurality of second-1 electrodes and a second-2 channel signal to activate the plurality of second-2 electrodes, and the plurality of second DEMUX modules may include a first switching element which is operated according to the second-1 channel signal and a second switching element which is operated according to the second-2 channel signal.

According to an embodiment of the present disclosure, an electronic device may comprise: a display device which includes a touch panel; a pen detachably coupled to a housing of the electronic device; a sensor module configured to detect whether the pen is detached or attached; and a control module configured to control an operation of the touch panel based on whether the pen is detached or attached. The touch panel includes: a substrate; a first touch electrode part including a plurality of first-1 electrodes and a plurality of first-2 electrodes, which are alternately arranged on the substrate in a first direction at a designated spacing; a second touch electrode part including a plurality of second-1 electrodes and a plurality of second-2 electrodes, which are alternately arranged on the substrate in a second direction perpendicular to the first direction at the designated spacing; a plurality of first DEMUX modules which each share an adjacent first-1 electrode and first-2 electrode of the first touch electrode part with one output; a plurality of second DEMUX modules which each share an adjacent second-1 electrode and the second-2 electrode of the second touch electrode part with one output; and a touch sensor which includes a plurality of first touch channels each connected with the plurality of first DEMUX modules, and a plurality of second touch channels each connected with the plurality of second DEMUX modules. The touch sensor is configured to provide a first channel signal to control operations of the plurality of first DEMUX modules to the plurality of first DEMUX modules, and provide a second channel signal to control operations of the plurality of second DEMUX modules to the plurality of second DEMUX modules.

According to an embodiment, the control module may be configured to: when detachment of the pen is not recognized through the sensor module, control the touch sensor to recognize a touch with a first precision using only the plurality of first-1 electrodes and the plurality of second-1 electrodes; and when the detachment of the pen is recognized through the sensor module, control the touch sensor to recognize a touch with a second precision lower than the first precision using the plurality of first-1 electrodes, the plurality of first-2 electrodes, the plurality of second-1 electrodes, and the plurality of second-2 electrodes.

According to an embodiment of the present disclosure, a method for operating an electronic device which includes a touch panel may comprise: detecting activation of the touch panel; determining whether a pen mode is activated, in response to detecting the activation of the touch panel; detecting a pen touch input using all of a plurality of touch electrodes connected to each touch channel, when the pen mode is activated as a result of the determination; and detecting a finger touch input using some of the plurality of touch electrodes connected to each touch channel, when the pen mode is not activated as the result of the determination.

BRIEF DESCRIPTION OF THE DRAWINGS

The above and other features and other advantages of the present disclosure will be more clearly understood from the following detailed description taken in conjunction with the accompanying drawings.

DETAILED DESCRIPTION OF THE EMBODIMENTS

Figure 1:
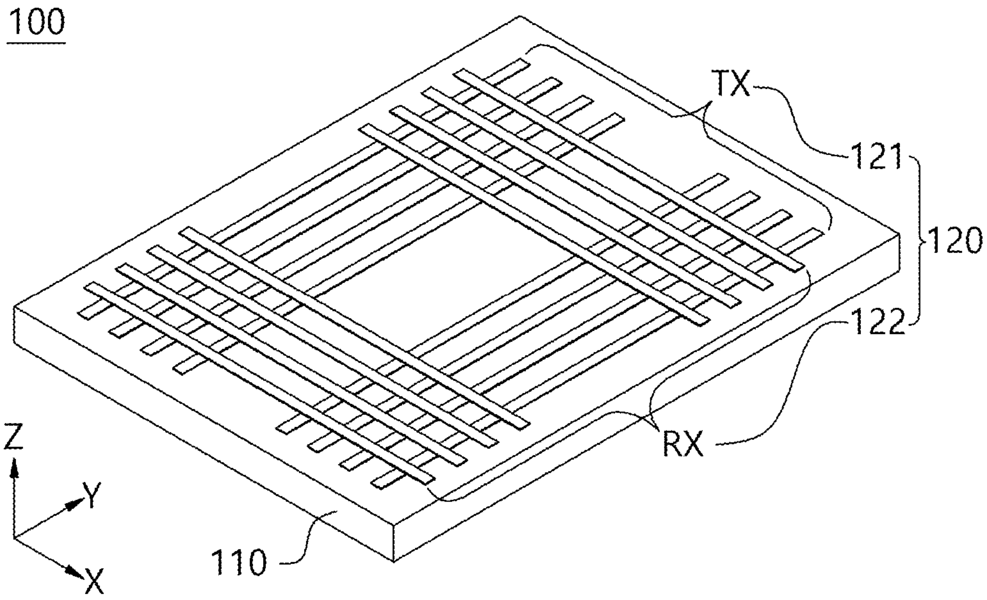
FIG. 1 is a view schematically illustrating a touch panel according to an embodiment of the present disclosure.

Hereinafter, various embodiments of the present disclosure will be described with reference to the accompanying drawings. Specific embodiments of the present disclosure will be illustrated in the drawings and described in the following detailed description related thereto, but it is not intended to limit the various embodiments of the present disclosure to a specific form. For example, it is obvious to those skilled art to which the present disclosure pertains that the embodiments of the present disclosure may be variously modified.

Figure 2:
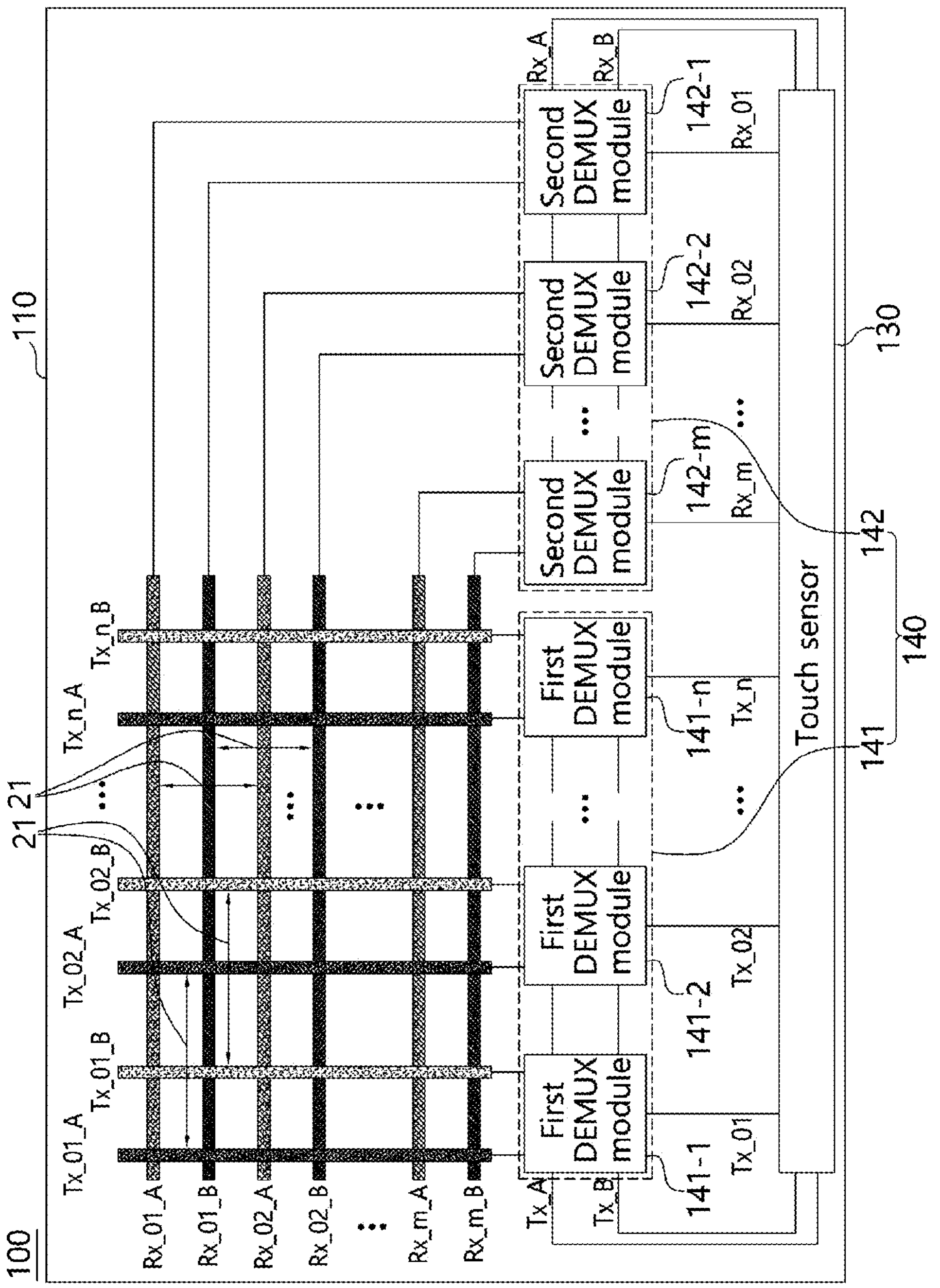
FIG. 2 is a view illustrating the touch panel according to an embodiment of the present disclosure in detail.
Figure 3A:
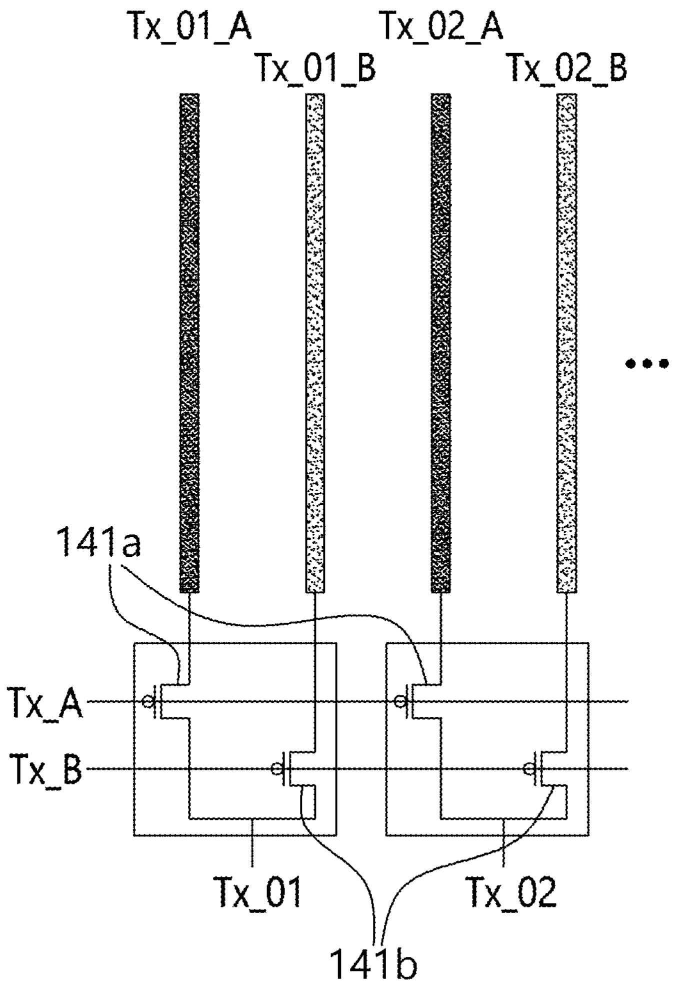
FIG. 3A is a view illustrating a configuration of a DEMUX module according to an embodiment of the present disclosure.
Figure 3B:
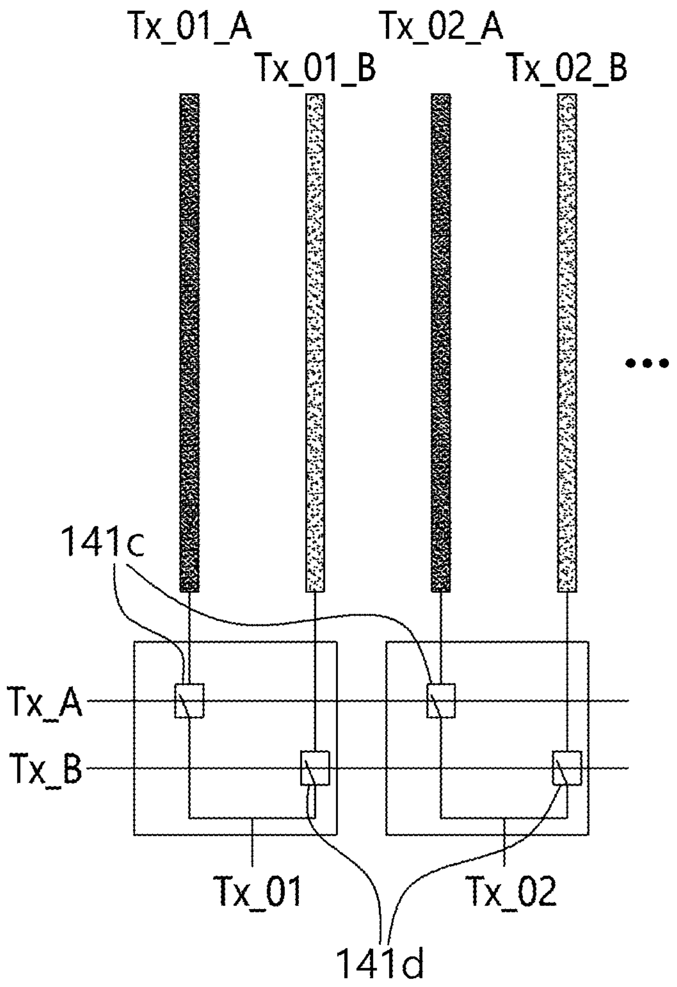
FIG. 3B is a view illustrating a configuration of a DEMUX module according to an embodiment of the present disclosure.

FIG. 1 is a view schematically illustrating a touch panel 100 according to an embodiment of the present disclosure. FIG. 2 is a view illustrating the touch panel 100 according to an embodiment of the present disclosure in detail. FIG. 3A is a view illustrating a configuration of a DEMUX module according to an embodiment of the present disclosure. FIG. 3B is a view illustrating a configuration of a DEMUX module according to an embodiment of the present disclosure.

Referring to FIGS. 1 to 3B, the touch panel (or touch screen panel (TSP)) 100 according to an embodiment of the present disclosure may include a substrate 110, a touch electrode part 120, a touch sensor 130 and de-multiplexer (DEMUX) module(s) 140.

The substrate 110 may have the touch electrode part 120 arranged (or formed) thereon. The substrate 110 may be formed of various materials (e.g., plastic, glass, etc.). The substrate 110 may be transparent or opaque. The substrate 110 may be formed of a rigid or flexible material.

The substrate 110 may be formed separately from a display panel (not shown) on which the touch panel 100 is mounted (e.g., an add-on type touch panel). For example, a film type (e.g., a PET film) or glass type substrate 110 on which touch electrodes are formed may be attached to a top of the display panel through a transparent adhesive (e.g., an optically clear adhesive (OCA)). As another example, the substrate 110 may be integrated with a cover window. In other words, the touch electrode part 120 may be formed at a bottom of the cover window for protecting the display panel. As another example, the substrate 110 may be integrated with the display panel. In other words, the touch electrode part 120 may be formed on the top of the display panel (e.g., an on-cell type touch panel) or within the display panel (e.g., an in-cell type touch panel).

The touch electrode part 120 may include a plurality of transparent electrodes arranged in a matrix form on the substrate 110. The touch electrode part 120 may be formed of a transparent conductive film (e.g., an indium tin oxide (ITO)) or a metal mesh. The touch electrode part 120 may include a first touch electrode part 121 and a second touch electrode part 122.

The first touch electrode part 121 may include a plurality of first electrodes TX arranged in a first direction (X-axis direction). The second touch electrode part 122 may include a plurality of second electrodes RX arranged in a second direction (Y-axis direction) perpendicular to the first direction. The first touch electrode part 121 may be used to recognize an X-axis coordinate of touch input, and the second touch electrode part 122 may be used to recognize a Y-axis coordinate of the touch input. Here, the first direction may be referred to as a horizontal direction or a row direction. The second direction may be referred to as a vertical direction or a column direction.

According to an embodiment, the plurality of first electrodes TX included in the first touch electrode part 121 may include a plurality of first-1 electrodes Tx_01_A, Tx_02_A and Tx_n_A and a plurality of first-2 electrodes Tx_01_B, Tx_02_B and Tx_n_B, which are alternately arranged on the substrate 110 in the first direction at a designated spacing 21

(e.g., "4.0 mm"). Similarly, the plurality of second electrodes RX included in the second touch electrode part 122 may include a plurality of second-1 electrodes Rx_01_A, Rx_02_A and Rx_m_A and a plurality of second-2 electrodes Rx_01_B, Rx_02_B and Rx_m_B, which are alternately arranged on the substrate 110 in the second direction at the designated spacing 21 (e.g., "4.0 mm"). The designated spacing may be a distance generally required to properly recognize a finger touch. At this time, a spacing between the adjacent first-1 electrode Tx_01_A and the first-2 electrode Tx_01_B may be ½ (e.g., "2 mm") of the designated spacing 21. Similarly, a spacing between adjacent second-1 electrode Rx_01_A and second-2 electrode Rx_01_B may be ½ (e.g., "2 mm") of the designated spacing 21.

The plurality of first-1 electrodes Tx_01_A, Tx_02_A and Tx_n_A may be operated based on a first-1 channel signal Tx_A received from the touch sensor 130, and the plurality of first-2 electrodes Tx_01_B, Tx_02_B and Tx_n_B may be operated based on a first-2 channel signal Tx_B received from the touch sensor 130. Similarly, the plurality of second-1 electrodes Rx_01_A, Rx_02_A and Rx_m_A may be operated based on a second-1 channel signal Rx_A received from the touch sensor 130, and the plurality of second-2 electrodes Rx_01_B, Rx_02_B and Rx_m_B may be operated based on a second-2 channel signal Rx_B received from the touch sensor 130.

The touch sensor 130 may be electrically connected with the touch electrode part 120. According to an embodiment, the touch sensor 130 may be electrically connected with the touch electrode part 120 through the DEMUX module 140. The touch sensor 130 may recognize a touch input (e.g., a finger touch input and a pen touch input) and a touch position (e.g., a coordinate) based on changes (e.g., changes in electrostatic capacitance) occurring in the first touch electrode part 121 and the second touch electrode part 122. To this end, the touch sensor 130 may include a plurality of first touch channels Tx_01, Tx_02 and Tx_n for detecting touch inputs of the first touch electrode part 121 and a plurality of second touch channels Rx_01, Rx_02 and Rx_m for detecting touch inputs of the second touch electrode part 122. Here, "n" and "m" may be natural numbers. For example, when the touch panel 100 has a size of 10.86 inches, "n" and "m" may be "37" and "59", respectively. In other words, the touch sensor 130 may include "37" first touch channels and "59" second touch channels.

According to an embodiment, the plurality of touch channels may be respectively connected with a pair of adjacent touch electrodes through the DEMUX module 140. For example, a first-1 touch channel Tx_01 among the touch channels may be connected with the first-1 electrode Tx_01_A and the first-2 electrode Tx_01_B through one of a plurality of first DEMUX modules 141. In addition, a second-1 touch channel Rx_01 among the touch channels may be connected with the second-1 electrode Rx_01_A and the second-2 electrode Rx_01_B through one of a plurality of second DEMUX modules 142.

The touch sensor 130 may recognize the X-axis coordinate of the touch input based on a change (e.g., a change in electrostatic capacitance) of the first touch electrode part 121 received through the first touch channels Tx_01, Tx_02 and Tx_n, and may recognize the Y-axis coordinate of the touch input based on a change (e.g., a change in electrostatic capacitance) of the second touch electrode part 122 received through the second touch channels Rx_01, Rx_02 and Rx_m.

The touch sensor 130 may provide a first channel signal to control operations of the plurality of first DEMUX modules 141 to the plurality of first DEMUX modules 141. The first channel signal may include the first-1 channel signal Tx_A to activate the plurality of first-1 electrodes Tx_01_A, Tx_02_A and Tx_n_A (e.g., to connect the plurality of first-1 electrodes Tx_01_A, Tx_02_A and Tx_n_A with the plurality of first touch channels Tx_01, Tx_02 and Tx_n, respectively) and the first-2 channel signal Tx_B to activate the plurality of first-2 electrodes Tx_01_B, Tx_02_B and Tx_n_B (e.g., to connect the plurality of first-2 electrodes Tx_01_B, Tx_02_B and Tx_n_B with the plurality of first touch channels Tx_01, Tx_02 and Tx_n, respectively). In addition, the touch sensor 130 may provide a second channel signal to the plurality of second DEMUX modules 142 to control operations of the plurality of second DEMUX modules 142. The second channel signal may include the second-1 channel signal Rx_A to activate the plurality of second-1 electrodes Rx_01_A, Rx_02_A and Rx_m_A (e.g., to connect the plurality of second-1 electrodes Rx_01_A, Rx_02_A and Rx_m_A with the plurality of second touch channels Rx_01, Rx_02 and Rx_m, respectively) and the second-2 channel signal Rx_B to activate the plurality of second-2 electrodes Rx_01_B, Rx_02_B and Rx_m_B (e.g., to connect the plurality of second-2 electrodes Rx_01_B, Rx_02_B and Rx_m_B with the plurality of second touch channels Rx_01, Rx_02 and Rx_m, respectively).

According to an embodiment, when the touch sensor 130 detects a touch input (e.g., a finger touch input) with a first precision, the plurality of first-1 electrodes Tx_01_A, Tx_02_A and Tx_n_A and the plurality of second-1 electrodes Rx_01 A, Rx_02_A and Rx_m_A may be may activated through the first-1 channel signal Tx_A and a second-1 channel signal Rx_A, and the plurality of first-2 electrodes Tx_01_B, Tx_02_B and Tx_n_B and the plurality of second-2 electrodes Rx_01_B, Rx_02_B and Rx_m_B may be deactivated through the first-2 channel signal Tx_B and the second-2 channel signal Rx_B. When the touch sensor 130 detects a touch input (e.g., a pen touch input) with a second precision smaller than the first precision, the plurality of first-1 electrodes Tx_01_A, Tx_02_A and Tx_n_A, the plurality of first-2 electrodes Tx_01_B, Tx_02_B and Tx_n_B, the plurality of second-1 electrodes Rx_01_A, Rx_02_A and Rx_m_A, and the plurality of second-2 electrodes Rx_01_B, Rx_02_B and Rx_m_B may be may activated. At this time, the touch sensor 130 may control the first DEMUX module 141 in a time division manner to sequentially connect the plurality of first-1 electrodes Tx_01_A, Tx_02_A and Tx_n_A or the plurality of first-2 electrodes Tx_01_B, Tx_02_B and Tx_n_B with the plurality of first touch channels Tx_01, Tx_02 and Tx_n. In addition, the touch sensor 130 may control the second DEMUX module 142 in the time division manner to sequentially connect the plurality of second-1 electrodes Rx_01_A, Rx_02_A and Rx_m_A or the plurality of second-2 electrodes Rx_01_B, Rx_02_B and Rx_m_B with the plurality of second touch channels Rx_01, Rx_02 and Rx_m.

According to an embodiment, the touch sensor 130 may recognize a touch with a first precision through the plurality of first-1 electrodes Tx_01_A, Tx_02_A and Tx_n_A and the plurality of second-1 electrodes Rx_01_A, Rx_02_A and Rx_m_A in a first touch mode, and recognize a touch with a second precision smaller than the first precision through the plurality of first-1 electrodes Tx_01_A, Tx_02_A and Tx_n_A, the plurality of first-2 electrodes Tx_01_B, Tx_02_B and Tx_n_B, the plurality of second-1 electrodes Rx_01_A, Rx_02_A and Rx_m_A, and the plurality of second-2 electrodes Rx_01_B, Rx_02_B and Rx_m_B in a second touch mode. As used herein, a precision refers to the size of the touch input. For example, a pen touch input has a size of contact smaller than a size of contact of a finger touch input. Accordingly, the precision of the pen touch input, e.g., a second precision, is smaller than the precision of the finger touch input, e.g., the first precision.

Here, the first touch mode may be a mode to recognize a finger touch, and the second touch mode may be a mode to recognize a pen touch.

Further, the touch sensor 130 may distinguish inputs of the adjacent first-1 electrode Tx_01_A and the first-2 electrode Tx_01_B in a time division manner, and distinguish inputs of the adjacent second-1 electrode Rx_01_A and the second-2 electrode Rx_01_B in the time division manner in the second touch mode.

The DEMUX module 140 may share a plurality of inputs with one output. The DEMUX module 140 may include the plurality of first DEMUX modules 141, e.g., 141-1 to **141-*n*, and the plurality of second DEMUX modules 142, e.g., 142-1 to 142-*m***.

The plurality of first DEMUX modules 141 may share the plurality of first-1 electrodes Tx_01_A, Tx_02_A and Tx_n_A and the plurality of first-2 electrodes Tx_01_B, Tx_02_B and Tx_n_B with the plurality of first touch channels Tx_01, Tx_02 and Tx_n. For example, the first-1 DEMUX module 141-1 may share the first-1 electrode Tx_01_A and the first-2 electrode Tx_01_B with the first-1 touch channel Tx_01, and the first-2 DEMUX module 141-2 may share the first-1 electrode Tx_02_A and the first-2 electrode Tx_02_B with the first-2 touch channel Tx_02.

According to an embodiment, the plurality of first DEMUX modules 141 may each include a first switching element (e.g., a transistor) **141*a* switched by the first-1 channel signal Tx_A provided from the touch sensor 130 and a second switching element (e.g., a transistor) 141*b* switched by the first-2 channel signal Tx_B, as illustrated in FIG. 3A. As another example, the plurality of first DEMUX modules 141 may each include a first switch 141*c* controlled by the first-1 channel signal Tx_A and a second switch 141*d* controlled by the first-2 channel signal Tx_B, which are provided from the touch sensor 130, as illustrated in FIG. 3**B.

The plurality of second DEMUX modules 142 may share the plurality of second-1 electrodes Rx_01_A, Rx_02_A and Rx_m_A and the plurality of second-2 electrodes Rx_01_B, Rx_02_B and Rx_m_B with the plurality of second touch channels Rx_01, Rx_02 and Rx_m. For example, a second-1 DEMUX module 142-1 may share the second-1 electrode Rx_01_A and the second-2 electrode Rx_01_B with the second-1 touch channel Rx_01, and a second-2 DEMUX module 142-2 may share a second-1 electrode Rx_02_A and a second-2 electrode Rx_02_B with a second-2 touch channel Rx_02.

According to an embodiment, the plurality of second DEMUX modules 142 may each include a first switching element and a second switching element (or a first switch and a second switch), similar to the first DEMUX module 141.

Although FIG. 2 illustrates the case where the touch electrode part 120, the touch sensor 130, and the DEMUX modules 140 are arranged on the substrate 110, this is only an example and does not limit the present disclosure. For example, only the touch electrode part 120 may be arranged (located) on the substrate 110, and the touch sensor 130 and the DEMUX modules 140 may be arranged (located) on a main printed circuit board (not shown) of an external device (e.g., an electronic device in FIG. 4) to which the touch panel 100 is connected.

Further, in FIGS. 1 and 2, for the convenience of description, the plurality of electrodes constituting the first touch electrode part 121 (e.g., the plurality of first-1 electrodes and the plurality of first-2 electrodes) and the plurality of electrodes constituting the second touch electrode part 122 (e.g., the plurality of first-1 electrodes and the plurality of first-2 electrodes) are illustrated in the straight line form. However, each electrode of the first touch electrode part 121 may include a plurality of first sensor patterns having various shapes (e.g., a square, diamond, etc.) and a first connection pattern which electrically connects the adjacent first sensor patterns. In addition, each electrode of the second touch electrode part 122 may include a plurality of second sensor patterns having various shapes and a second connection pattern which electrically connects the adjacent second sensor patterns. The first connection patterns and the second connection patterns may be arranged in different layers so as not to be electrically connected.

The above-described touch panel 100 may support a pen input using a low-performance (and/or low-cost) touch sensor having the smaller number of touch channels than the number of touch channels required to support the pen input. For example, various embodiments of the present disclosure may provide a touch input (e.g., the pen touch input) with the second precision smaller than the first precision using a touch sensor which supports the touch input with the first precision (e.g., the finger touch input). In other words, various embodiments of the present disclosure may provide an effect equal to the effect of increasing (or enlarging) the number of touch channels supported by the touch sensor. Through this, the present disclosure may reduce manufacturing costs of a touch panel which supports the pen input, a display device including the touch panel, and an electronic device including the touch panel or the display device. In addition, the touch panel may support the touch input (e.g., the finger touch input and pen touch input) using the low-performance (and/or low-cost) touch sensor, thereby improving (e.g., reducing) power consumption.

Figure 4:
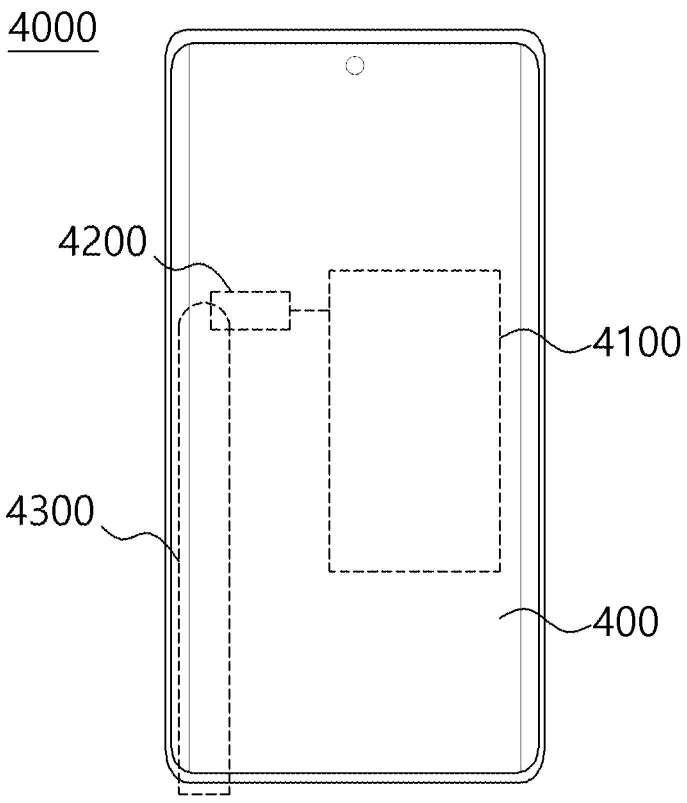
FIG. 4 is a view illustrating an electronic device according to an embodiment of the present disclosure.

FIG. 4 is a view illustrating an electronic device 4000 according to an embodiment of the present disclosure.

Referring to FIG. 4, the electronic device 4000 according to an embodiment of the present disclosure may support a touch input (e.g., including a touch panel). For example, the electronic device according to various embodiments of the present disclosure may be diverse forms of devices. The electronic device may include, for example, a rigid type or flexible type portable communication device (e.g., a smart phone), a computer device, a portable multimedia device, a portable medical device, a camera, a multimedia device installed in, embedded in, or integrally formed with an automobile, or a home appliance device. The electronic device according to an embodiment of the present disclosure is not limited to the above-described devices.

According to an embodiment, the electronic device 4000 may include a display device (e.g., a touch screen) 400, a control module 4100, a sensor module 4200, and a pen 4300.

The display device 400 may be mounted inside the electronic device 4000. For example, the display device 400 may be exposed through a front surface of the electronic device 4000. The display device 400 may provide (e.g., display) various images (e.g., still images or moving images). In addition, the display device 400 may support the touch input (e.g., the finger touch and pen touch). For example, the display device 400 may separately or integrally include a touch panel (e.g., the touch panel 100 of FIGS. 1 to 3B).

The pen 4300 may be detachably coupled to a housing (e.g., case) of the electronic device 4000. The pen 4300 may include a stylus and an electronic pen. The pen 4300 may require a touch precision more precise than that of a finger (hereinafter, referred to as the second precision).

The sensor module 4200 may detect whether the pen 4300 is detached or attached. The sensor module 4200 may include a pressure sensor mounted at a position pressed by the pen 4300 when inserting the pen 4300, a Hall sensor for detecting a magnet mounted on the pen 4300 and the like. This is only an example, and the sensor module 4200 may include various sensors.

The control module 4100 may control the image display and touch input of the display device 400. According to an embodiment, the control module 4100 may control operation modes of the touch panel included in the display device 400 based on whether the pen is detached or attached. For example, when the detachment (or removal) of the pen 4300 is detected (or recognized) through the sensor module 4200, the control module 4100 may control the touch panel to be operated in a pen mode. Specifically, the control module 4100 may transmit a command requesting to activate the plurality of first-1 electrodes, the plurality of first-2 electrodes, the plurality of second-1 electrodes, and the plurality of second-2 electrodes to a touch sensor (not shown). In an embodiment, the control module 4100 may transmit a status message notifying that the pen is being detached to the touch sensor, and the touch sensor that has received the status message may activate the plurality of first-1 electrodes, the plurality of first-2 electrodes, the plurality of second-1 electrodes, and the plurality of second-2 electrodes.

On the other hand, when it is detected (or recognized) that the pen 4300 is attached to (or inserted into) the housing of the electronic device 4000 by the sensor module 4200, the control module 4100 may control the touch panel to be operated in a finger mode. For example, the control module 4100 may transmit a command requesting to activate only the plurality of first-1 electrodes and the plurality of second-1 electrodes to the touch sensor (not shown). In an embodiment, the control module 4100 may transmit a status message notifying that the pen is being inserted to the touch sensor, and the touch sensor that has received the status message may activate only the plurality of first-1 electrodes and the plurality of second-1 electrodes. The control module 4100 will be described in detail below with reference to FIG. 5.

In the FIG. 4, it has been described that the electronic device 4000 supports the pen touch input. However, the present disclosure is not limited thereto. For example, various embodiments of the present disclosure may be applied even to the case where the touch input with the first precision and the touch input with the second precision are supported, even when the pen input is not supported.

Figure 5:
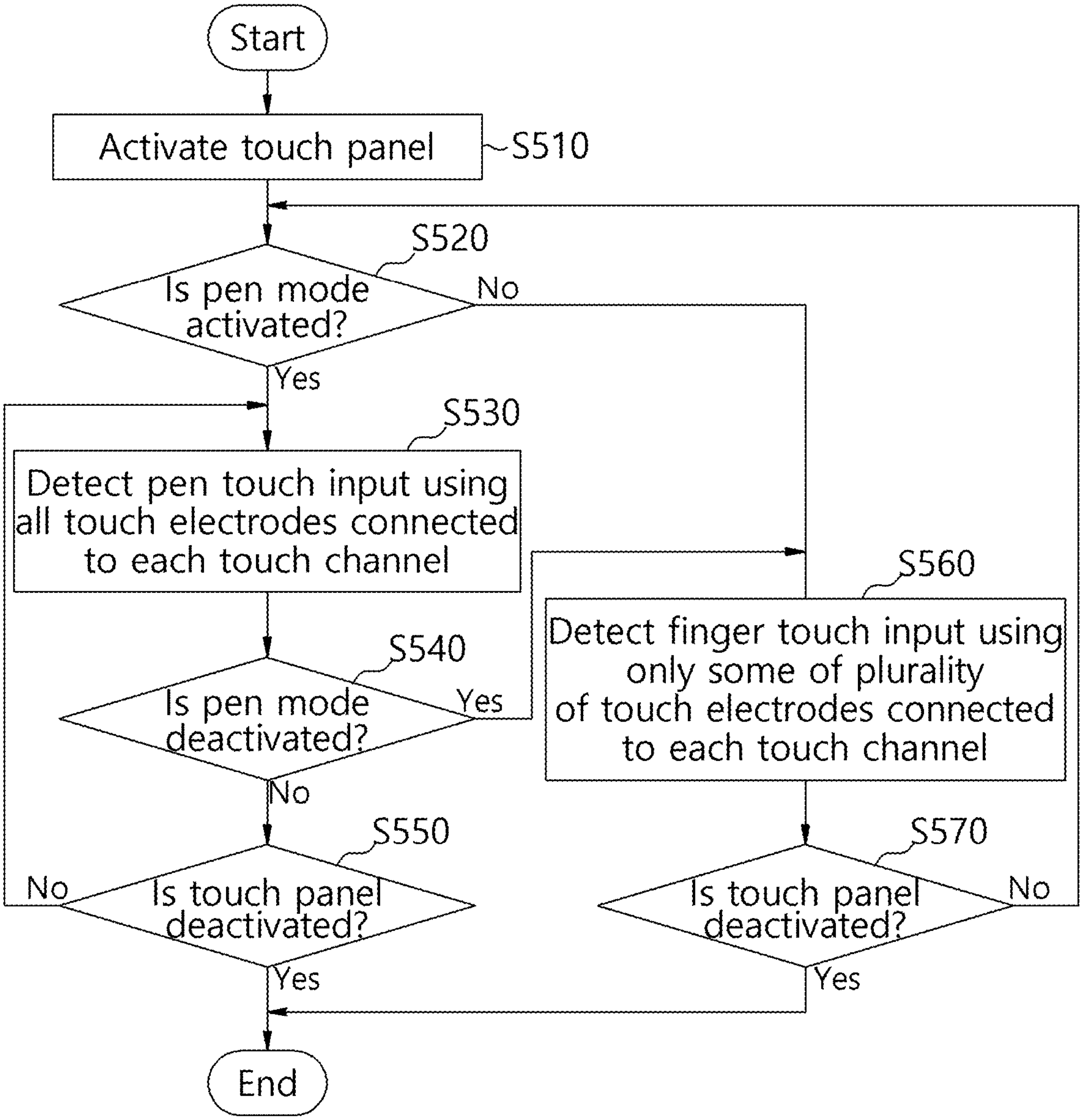
FIG. 5 is a flowchart for describing a method for operating an electronic device including the touch panel according to an embodiment of the present disclosure.

FIG. 5 is a flowchart for describing a method for operating an electronic device including the touch panel according to an embodiment of the present disclosure.

Referring to FIG. 5, the method for operating an electronic device including the touch panel according to an embodiment of the present disclosure may include an operation S510 of activating the touch panel. For example, the electronic device (e.g., the control module 4100 of the electronic device 4000 in FIG. 4) may activate the touch panel when the display device 400 is activated. As another example, the electronic device (e.g., the control module 4100 of the electronic device 4000 in FIG. 4) may activate the touch panel as needed even when the display device 400 is in a deactivated state.

The method may include an operation S520 of determining whether the pen mode is activated. For example, the electronic device (e.g., the control module 4100 of the electronic device 4000 in FIG. 4) may determine whether a pen (e.g., the pen 4300 in FIG. 4) is detached from the housing of the electronic device through a sensor module (e.g., the sensor module 4200 in FIG. 4).

As a result of the determination in the operation S520, when the pen mode is activated, the method may proceed to an operation S530 of detecting a pen touch input using all touch electrodes connected to each touch channel. For example, the electronic device (e.g., the control module 4100 of the electronic device 4000 in FIG. 4) may control a touch sensor (e.g., the touch sensor 130 in FIG. 2) included in a display device (e.g., the display device 400 in FIG. 4) to activate the plurality of first-1 electrodes Tx_01_A, Tx_02_A and Tx_n_A, the plurality of first-2 electrodes Tx_01_B, Tx_02_B and Tx_n_B, the plurality of second-1 electrodes Rx_01_A, Rx_02_A and Rx_m_A, and the plurality of second-2 electrodes Rx_01_B, Rx_02_B and Rx_m_B. At this time, the touch sensor 130 may control the plurality of first DEMUX modules 141 in the time division manner to sequentially connect the plurality of first-1 electrodes Tx_01_A, Tx_02_A and Tx_n_A or the plurality of first-2 electrodes Tx_01_B, Tx_02_B and Tx_n_B with the plurality of first touch channels Tx_01, Tx_02 and Tx_n. In addition, the touch sensor 130 may control the plurality of second DEMUX modules 142 in the time division manner to sequentially connect the plurality of second-1 electrodes Rx_01_A, Rx_02_A and Rx_m_A or the plurality of second-2 electrodes Rx_01_B, Rx_02_B and Rx_m_B with the plurality of second touch channels Rx_01, Rx_02 and Rx_m. The touch sensor 130 may provide touch information detected through all of the plurality of touch electrodes (e.g., the plurality of first-1 electrodes Tx_01_A, Tx_02_A and Tx_n_A, the plurality of first-2 electrodes Tx_01_B, Tx_02_B and Tx_n_B, the plurality of second-1 electrodes Rx_01_A, Rx_02_A and Rx_m_A, and the plurality of second-2 electrodes Rx_01_B, Rx_02_B and Rx_m_B) to the control module 4100.

The method may include an operation S540 of determining whether the pen mode is deactivated. For example, the electronic device (e.g., the control module 4100 of the electronic device 4000 in FIG. 4) may determine whether the pen (e.g., the pen 4300 in FIG. 4) is inserted into the housing of the electronic device through the sensor module (e.g., the sensor module 4200 in FIG. 4).

As a result of the determination in the operation S540, when the pen mode is deactivated, the method may proceed to an operation S560 described below. On the other hand, as the result of the determination in the operation S540, when the pen mode is not deactivated, the method may include an operation S550 of determining whether the touch panel is deactivated. For example, the electronic device (e.g., the control module 4100 of the electronic device 4000 in FIG. 4) may determine whether the display device 400 is deactivated.

When the touch panel is not deactivated as a result of the determination in the operation S550, the method may return to the operation S530. On the other hand, when the touch panel is deactivated as the result of the determination in the operation S550, the method may be terminated.

When the pen mode is not activated as a result of the determination of the operation S520, the method may proceed to an operation S560 of detecting a finger touch input using only some of the plurality of touch electrodes connected to each touch channel. For example, the electronic device (e.g., the control module 4100 of the electronic device 4000 in FIG. 4) may control the touch sensor (e.g., the touch sensor 130 in FIG. 2) included in the display device (e.g., the display device 400 in FIG. 4) to activate the plurality of first-1 electrodes Tx_01_A, Tx_02_A and Tx_n_A and the plurality of second-1 electrodes Rx_01_A, Rx_02_A and Rx_m_A, and deactivate the plurality of first-2 electrodes Tx_01_B, Tx_02_B and Tx_n_B and the plurality of second-2 electrodes Rx_01_B, Rx_02_B and Rx_m_B. At this time, the touch sensor 130 may control the plurality of first DEMUX modules 141 (e.g., transmit the first-1 channel signal Tx_A to turn on the first switching element 141*a* (or the first switch 141*c*) and the first-2 channel signal Tx_B to turn off the second switching element 141*b* (or the second switch 141*d*) to the plurality of first DEMUX modules 141) to connect the plurality of first-1 electrodes Tx_01_A, Tx_02_A and Tx_n_A and the plurality of first touch channels Tx_01, Tx_02 and Tx_n, respectively. In addition, the touch sensor 130 may control the plurality of second DEMUX modules 142 (e.g., transmit the second-1 channel signal Rx_A to turn on the first switching element (or the first switch) of the second DEMUX module 142 and the second-2 channel signal Rx_B to turn off the second switching element (or the second switch) of the second DEMUX module 142 to the plurality of second DEMUX modules 142) to connect the plurality of second-1 electrodes Rx_01_A, Rx_02_A and Rx_m_A and the plurality of second touch channels Rx_01, Rx_02 and Rx_m, respectively. The touch sensor 130 may provide touch information detected through some of the plurality of touch electrodes (e.g., the plurality of first-1 electrodes Tx_01_A, Tx_02_A and Tx_n_A and the plurality of second-1 electrodes Rx_01_A, Rx_02_A and Rx_m_A) to the control module 4100.

The method may include an operation S570 of determining whether the touch panel is deactivated. When the touch panel is not deactivated as a result of the determination in the operation S570, the method may return to the operation S520. On the other hand, when the touch panel is deactivated as a result of the determination in the operation S570, the method may be terminated.

In the above, various embodiments of the present disclosure have been described using the case where each touch channel of the touch sensor shares two touch electrodes using the DEMUX module as an example. However, according to some embodiments, each touch channel may share three or more touch electrodes. According to an embodiment, the number of touch electrodes shared by each touch channel may be different. For example, some of the plurality of touch channels may share two touch electrodes, and others may share three touch electrodes. Specifically, when recognizing biometric information (e.g., fingerprint) through a portion of a display area, the touch channels corresponding to the portion of the area may each share three (or three or more) touch electrodes, and the touch channels of the remaining areas may share two touch electrodes, respectively.

Various embodiments of the present disclosure may support the pen input which requires a large number of touch channels using the low-performance (and/or low-cost) touch sensor having the relatively small number of touch channels. For example, various embodiments of the present disclosure may provide the touch input with the second precision (e.g., the pen touch input) smaller than the first precision using the touch sensor which supports the touch input with first precision (e.g., finger touch input). In other words, various embodiments of the present disclosure may provide an effect equal to the effect of increasing (or enlarging) the number of touch channels supported by the touch sensor. Through this, the present disclosure may reduce the manufacturing costs of a touch panel supporting the pen input, a display device including the touch panel, and an electronic device including the display device (or the touch panel).

In addition, various embodiments of the present disclosure may reduce power consumption of the electronic device including the touch panel. For example, various embodiments of the present disclosure may improve (e.g., reduce) power consumption by processing the touch input (e.g., supporting the finger touch input and pen touch input) using the low-performance (and/or low-cost) touch sensor without using the high-performance (and/or high-cost) touch sensor having the relatively large number of touch channels.

Various embodiments of the present disclosure and the terms used herein do not limit the technical characteristics described in the present disclosure to specific embodiments, and should be construed to include various modifications, equivalents, or replacements of the embodiments. With regard to the description of the drawings, similar or related components may be denoted by similar reference numerals. It is to be understood that a singular form of a noun corresponding to an item may include one or a plurality of the things, unless the relevant context clearly indicates otherwise. As used herein, each of phrases such as "A or B," "at least one of A and B," "at least one of A or B," "A, B or C," "at least one of A, B and C," and "at least one of A, B or C" may include any one, or all possible combinations of these items enumerated together in the corresponding one of the phrases. As used herein, the terms such as "1st" and "2nd," or "first" and "second" may be used to simply distinguish the corresponding component from another component, and does not limit the corresponding components in other aspects (e.g., an importance or order). It is to be understood that if a component (e.g., a first component) is referred to as "coupled to" or "connected to" another component (e.g., a second component), with or without the term "operatively" or "communicatively," it means that the component may be coupled to the other component directly (e.g., by wire), wirelessly, or via a third component.

The term "module" used in various embodiments of the present disclosure may include a unit implemented in hardware, software or firmware way, and for example, may be used interchangeably with the terms such as logic, a logic block, a part, or a circuit. The module may be a part integrally formed therewith, or a minimum unit of the part or a portion thereof which performs one or more functions. For example, according to an embodiment, the module may be implemented in a form of an application-specific integrated circuit (ASIC).

Various embodiments of the present disclosure may be implemented by software (e.g., a program) including one or more instructions stored in a storage medium (e.g., an internal memory or an external memory) readable by a machine (e.g., the electronic device 4000). For example, a processor (e.g., a control module 4100) of the machine (e.g., the electronic device 4000) may call, among one or more instructions stored in the storage medium, at least one instruction, and may execute the instruction. This allows at least one function to be performed according to the called at least one instruction. The one or more instructions may include a code that is made by a compiler or a code that may be executed by an interpreter. The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM)) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, each component or element (e.g., a module or program) of the above-described components or elements may include one or a plurality of entities, and some of the plurality of entities may be disposed to other components with being separated therefrom. According to various embodiments, among the above-described components, one or more components or operations thereof may be omitted or one or more other components or operations thereof may be added to the components. In an embodiment, the plurality of components (e.g., the modules or programs) may be integrated into one component. In this case, the integrated components may perform one or more functions of each component of the plurality of components in a way that they are the same as or similar to the functions performed by the corresponding components among the plurality of components before the integration. According to various embodiments, operations performed by the modules, programs, or other components may be executed sequentially, in parallel, repeatedly, or heuristically, one or more operations may be executed in another sequence or omitted, or one or more other operations may be added thereto.

What is claimed is:

1. A touch panel comprising:

a substrate;

a first touch electrode part comprising a plurality of first-1 electrodes and a plurality of first-2 electrodes, which are alternately arranged on the substrate in a first direction at a designated spacing;

a second touch electrode part comprising a plurality of second-1 electrodes and a plurality of second-2 electrodes, which are alternately arranged on the substrate in a second direction perpendicular to the first direction at the designated spacing;

a plurality of first DEMUX modules which each share an adjacent first-1 electrode and first-2 electrode of the first touch electrode part with one output;

a plurality of second DEMUX modules which each share an adjacent second-1 electrode and the second-2 electrode of the second touch electrode part with one output; and a touch sensor which comprises a plurality of first touch channels each connected with the plurality of first DEMUX modules, and a plurality of second touch channels each connected with the plurality of second DEMUX modules, the touch sensor being configured to provide a first channel signal to control operations of the plurality of first DEMUX modules to the plurality of first DEMUX modules, and provide a second channel signal to control operations of the plurality of second DEMUX modules to the plurality of second DEMUX modules, wherein the touch sensor recognizes a touch with a first precision through the plurality of first-1 electrodes and the plurality of second-1 electrodes in a first touch mode, and recognizes a touch with a second precision different from the first precision through the plurality of first-1 electrodes, the plurality of first-2 electrodes, the plurality of second-1 electrodes, and the plurality of second-2 electrodes in a second touch mode.

2. The touch panel according to claim 1, wherein a spacing between the adjacent first-1 electrode and first-2 electrode and a spacing between the adjacent second-1 electrode and second-2 electrode are ½ of the designated spacing.

3. The touch panel according to claim 1, wherein the designated spacing is a distance required to recognize a finger touch.

4. The touch panel according to claim 1, wherein the touch sensor distinguishes inputs of the adjacent first-1 electrode and the first-2 electrode in a time division manner, and distinguishes inputs of the adjacent second-1 electrode and the second-2 electrode in the time division manner in the second touch mode.

5. The touch panel according to claim 1, wherein the first touch mode is a mode to recognize a finger touch, and the second touch mode is a mode to recognize a pen touch.

6. The touch panel according to claim 1, wherein the first channel signal comprises a first-1 channel signal to activate the plurality of first-1 electrodes and a first-2 channel signal to activate the plurality of first-2 electrodes, and the plurality of first DEMUX modules comprise a first switching element which is operated according to the first-1 channel signal and a second switching element which is operated according to the first-2 channel signal.

7. The touch panel according to claim 1, wherein the second channel signal comprises a second-1 channel signal to activate the plurality of second-1 electrodes and a second-2 channel signal to activate the plurality of second-2 electrodes, and the plurality of second DEMUX modules comprise a first switching element which is operated according to the second-1 channel signal and a second switching element which is operated according to the second-2 channel signal.

8. An electronic device comprising:

a display device which comprises a touch panel;

a pen detachably coupled to a housing of the electronic device;

a sensor module configured to detect whether the pen is detached or attached; and a control module configured to control an operation of the touch panel based on whether the pen is detached or attached, wherein the touch panel comprises:

a substrate;

a first touch electrode part comprising a plurality of first-1 electrodes and a plurality of first-2 electrodes, which are alternately arranged on the substrate in a first direction at a designated spacing;

a second touch electrode part comprising a plurality of second-1 electrodes and a plurality of second-2 electrodes, which are alternately arranged on the substrate in a second direction perpendicular to the first direction at the designated spacing;

a plurality of first DEMUX modules which each share an adjacent first-1 electrode and first-2 electrode of the first touch electrode part with one output;

a plurality of second DEMUX modules which each share an adjacent second-1 electrode and the second-2 electrode of the second touch electrode part with one output; and a touch sensor which comprises a plurality of first touch channels each connected with the plurality of first DEMUX modules, and a plurality of second touch channels each connected with the plurality of second DEMUX modules, the touch sensor being configured to provide a first channel signal to control operations of the plurality of first DEMUX modules to the plurality of first DEMUX modules, and provide a second channel signal to control operations of the plurality of second DEMUX modules to the plurality of second DEMUX modules.

9. The electronic device according to claim 8, wherein the control module is configured to:

when detachment of the pen is not recognized through the sensor module, control the touch sensor to recognize a touch with a first precision using only the plurality of first-1 electrodes and the plurality of second-1 electrodes; and when the detachment of the pen is recognized through the sensor module, control the touch sensor to recognize a touch with a second precision lower than the first precision using the plurality of first-1 electrodes, the plurality of first-2 electrodes, the plurality of second-1 electrodes, and the plurality of second-2 electrodes.

10. A method for operating an electronic device which comprises a touch panel, the method comprising:

detecting activation of the touch panel;

determining whether a pen mode is activated, in response to detecting the activation of the touch panel;

detecting a pen touch input using all of a plurality of touch electrodes connected to each touch channel, when the pen mode is activated as a result of the determination;

10 and detecting a finger touch input using some of the plurality of touch electrodes connected to each touch channel, when the pen mode is not activated as the result of the determination.

* * * * *